US011308300B2

United States Patent
Benito Altamirano et al.

(10) Patent No.: US 11,308,300 B2
(45) Date of Patent: Apr. 19, 2022

(54) COLOUR CORRECTION

(71) Applicant: UNIVERSITAT DE BARCELONA, Barcelona (ES)

(72) Inventors: Ismael Benito Altamirano, El Vendrell (ES); Olga Casals Guillen, Barcelona (ES); Cristian Fàbrega Gallego, Mollet del Vallès (ES); Juan Daniel Prades García, Barcelona (ES); Andreas Hans Wilhelm Waag, Würzburg (DE)

(73) Assignee: UNIVERSITAT DE BARCELONA, Barcelona (ES)

( * ) Notice: Subject to any disclaimer, the term of this patent is extended or adjusted under 35 U.S.C. 154(b) by 81 days.

(21) Appl. No.: 16/964,946

(22) PCT Filed: Jan. 24, 2019

(86) PCT No.: PCT/EP2019/051696
§ 371 (c)(1),
(2) Date: Jul. 24, 2020

(87) PCT Pub. No.: WO2019/145390
PCT Pub. Date: Aug. 1, 2019

(65) Prior Publication Data
US 2021/0042487 A1    Feb. 11, 2021

(30) Foreign Application Priority Data
Jan. 26, 2018   (EP) ..................... 18382043

(51) Int. Cl.
*G06K 7/14*     (2006.01)
*G06K 19/06*   (2006.01)
(Continued)

(52) U.S. Cl.
CPC ......... *G06K 7/1417* (2013.01); *G06K 7/1413* (2013.01); *G06K 19/06028* (2013.01);
(Continued)

(58) Field of Classification Search
CPC ........... G06K 7/1417; G06K 19/06037; G06K 19/0614; H04N 9/646
(Continued)

(56) References Cited

U.S. PATENT DOCUMENTS

| 2008/0023546 A1* | 1/2008 | Myodo | .................. G06K 7/14 |
| | | | 235/462.04 |
| 2012/0118970 A1* | 5/2012 | Zolotov | ............. G06K 7/10722 |
| | | | 235/462.04 |

(Continued)

FOREIGN PATENT DOCUMENTS

JP          2010 226580 A    10/2010

OTHER PUBLICATIONS

International Search Report and Written Opinion dated Apr. 25, 2019 for Application No. PCT/EP2019/051696, 11 pages.
(Continued)

*Primary Examiner* — Paultep Savusdiphol
(74) *Attorney, Agent, or Firm* — Squire Patton Boggs (US) LLP

(57) ABSTRACT

Methods are provided for generating a barcode with embedded colour palette for colour correction of a captured image in digital format. These methods comprise: generating an initial barcode according to a barcode standard and formed by light colour and dark colour encoding units jointly encoding a reference to storage location; splitting a predefined set of reference colours into reference dark and reference light colours depending on contrast threshold; modifying the initial barcode by replacing dark colour encoding units by reference dark colours and light colour
(Continued)

encoding units by reference light colours; and updating the storage location with data representing the reference colours included in the modified barcode and positions of said reference colours in the modified barcode. Methods are provided for colour correction based on a barcode determined by said methods. Computer programs and systems are provided which are suitable for performing said barcode generation methods and colour correction methods.

20 Claims, 6 Drawing Sheets

(51) Int. Cl.
| | |
|---|---|
| *G06T 5/00* | (2006.01) |
| *G06T 5/40* | (2006.01) |
| *G06T 11/00* | (2006.01) |
| *H04N 9/64* | (2006.01) |

(52) U.S. Cl.
CPC ........ *G06K 19/06037* (2013.01); *G06T 5/007* (2013.01); *G06T 5/40* (2013.01); *G06T 11/001* (2013.01); *H04N 9/646* (2013.01)

(58) Field of Classification Search
USPC ............ 235/462.01, 462.1, 462.04, 469, 494
See application file for complete search history.

(56) References Cited

U.S. PATENT DOCUMENTS

| | | | |
|---|---|---|---|
| 2015/0294460 A1* | 10/2015 | Satish | ............... G06T 7/0012 |
| | | | 382/128 |
| 2016/0379031 A1* | 12/2016 | Fang | ............... G06K 7/1443 |
| | | | 235/462.04 |
| 2017/0242421 A1* | 8/2017 | Ghazizadeh | ..... G06K 19/06046 |
| 2017/0243097 A1* | 8/2017 | Loy | ............... G06K 19/06037 |
| 2017/0316297 A1 | 11/2017 | Lee | |

OTHER PUBLICATIONS

Garateguy, et al.: "QR Images: Optimized Image Embedding in QR Codes", IEEE Transactions On Image Processing, IEEE Service Center, Piscataway, NJ, US, vol. 23, No. 7, Jul. 1, 2014 (Jul. 1, 2014), pp. 2842-2853; XP011548901, ISSN: 1057-7149, DOI:10.1109/TIP.2014.2321501 [retrieved on May 20, 2014].

* cited by examiner

COLOUR CORRECTION

CROSS-REFERENCE TO RELATED APPLICATIONS

This application is a national-stage filing under 37 USC 371(c) of International Application No. PCT/EP2019/051696, filed Jan. 24, 2019, which claims priority to, and the benefit of, European Patent Application EP18382043.0, filed Jan. 26, 2018, the entire contents of each of which are herein incorporated by reference in their entirety for all purposes.

The present disclosure relates to methods for determining a barcode with an embedded colour palette for colour correction of a captured image, and to computer programs, systems and computing systems suitable for performing such methods.

The present disclosure further relates to barcodes with an embedded colour palette generated by any of said methods, and to methods for producing such barcodes with embedded colour palettes. Sensor arrangements including any of said barcodes with embedded colour palettes are also provided for measuring an environmental or physical condition.

The present disclosure yet further relates to methods for colour correction of captured images by using any of the aforementioned barcodes with embedded colour palettes, and to computer programs, systems and computing systems suitable for performing such methods.

BACKGROUND ART

It is known that a digital captured image (e.g. a digital photography) may be colour-corrected based on a captured colour palette accompanying the captured image. The image and the colour palette thus need to be captured during the same operation of the corresponding capturing device.

Known colour palettes comprise a set of reference colours that are used as colour patterns (or models) to perform colour correction of the captured image. Two versions of such reference colours are used for that aim. One version corresponds to the real colours of the colour palette, and another version corresponds to apparent colours of the colour palette i.e. as "seen" in the captured colour palette.

A deviation between the real version of the reference colours and the captured (or apparent) version of the reference colours may be determined. Said deviation may denote a change in the reference colours due to e.g. particular light and/or capturing conditions theoretically causing a similar change in the colours of the image. This detected deviation between the real and apparent reference colours may be someway transferred or propagated to the colours of the captured image with the aim of achieving an approximation as accurate as possible of apparent colours in the captured image to corresponding real colours.

An object of the present disclosure is to improve the prior art methods, computer programs, systems and computing systems aimed at determining colour palettes, at obtaining/producing said colour palettes and to perform colour-correction of a captured image based on such colour palettes.

SUMMARY OF THE INVENTION

In an aspect, a method is provided for generating a barcode with an embedded colour palette for colour correction of a captured image in digital format. The method comprises generating an initial barcode according to a barcode standard (or pre-known specification), the initial barcode being formed by a plurality of encoding units each having a predetermined position in the barcode, and the plurality of encoding units including light colour encoding units and dark colour encoding units jointly encoding a reference to a storage location for storing data of the barcode. This barcode generating method further comprises splitting a predefined set of reference colours for colour correction into a set of reference dark colours and a set of reference light colours depending on a first contrast threshold.

The "generation" method still further comprises modifying the initial barcode (according to one or more predefined replacement criteria) by replacing, for each of at least some of the reference dark colours, a dark colour encoding unit by the reference dark colour, and replacing, for each of at least some of the reference light colours, a light colour encoding unit by the reference light colour. The barcode generating method yet further comprises updating the data of the storage location with data representing the reference colours included in the modified barcode and corresponding positions in the barcode attributed to said reference colours in the modified barcode.

With the proposed barcode generating method, a double function is attributed to the resulting barcode with the embedded colour palette. A coded reference to a storage location is provided (first function) along with reference colours for colour correction (second function). Once the reference to the storage location is obtained by decoding the barcode, the storage location may be accessed to obtain necessary data of the colour palette (or reference colours) to perform corresponding colour correction. This two-functional barcode may improve the efficiency of processing real reference colours and apparent reference colours (as seen in captured barcode) for determining colour deviations to be applied to the captured image for correcting its colour. The identification of (apparent and real) reference colours may be improved and, therefore, the determination of colour deviations may result more reliable in comparison with prior art colour palettes. Reference colours embedded in corresponding barcode may be more easily and efficiently identified in corresponding capture of the barcode which, in turn, may permit smaller samples of reference colours which, in turn, may permit considering higher quantities of reference colours. The quantity of reference colours to be used may depend on the application and/or the accuracy to be achieved by the colour correction. In applications wherein the number of reference colours is not a particular concern, resulting colour palette (and barcode embedding it) may be smaller in comparison with prior art colour palettes with same or similar number of reference colours. In applications requiring a number of reference colours as higher as possible, resulting colour palette (and barcode embedding it) may contain larger quantities of reference colours in comparison with prior art methods using colour palettes of same or similar size.

The predefined set of reference colours may include colours of a general purpose colour palette for colour correction or, alternatively, the predefined set of reference colours may be determined from a range of colours that are representative of a type of images to be captured and colour-corrected. Salient colours may be determined from the range of colours and said salient colours may be assumed as the predefined set of reference colours. The range of colours may be determined by colour sampling a plurality of example (or test) images that are representative of the type of images to be captured and colour-corrected. Salient colours may be determined from the range of colours by clustering the colours of the range of colours. Said clustering may be performed by applying any known technique aimed at that, such as e.g. k-means. Additionally, the predefined set of reference colours may include replicas of at least some of the reference colours so as to compensate for divergent light and/or capture conditions differently affecting the colour palette.

The first contrast threshold may be defined in terms of colour luminance, colour brightness, grayscale value or any scalar value of colour information accounting a difference in luminosity between colours. The one or more replacement criteria comprise a random selection of dark colour and light colour encoding units to be replaced by corresponding reference dark and light colours. Other replacement criterion or criteria may be alternatively used depending on e.g. spatial location of encoding units, predefined enabling/disabling of encoding units as selectable to be replaced, etc.

The first contrast (or splitting) threshold may correspond to an average value of a histogram of a set of colours including the dark and light colours of the initial barcode and the predefined reference colours. This may permit a more "accurate" classification of the reference colours into dark and light reference colours, so that corresponding barcode (with embedded reference colours) may be more successfully decodable according to the barcode standard or pre-known specification.

The barcode standard or pre-known specification may include an error correction mechanism to enforce that any barcode determined according to the standard or pre-known specification is globally decodable as long as a ratio of individually decodable encoding units in said barcode is above a predefined ratio of encoding units. Taking this into account, the first contrast threshold may be (pre)defined or adjusted so as to induce that the ratio of individually decodable encoding units is above the predefined ratio of encoding units. This may permit an even more potentially successful (standard) decoding of the barcode with embedded reference colours. Any known maximization method or similar may be used to maximize the ratio of individually decodable encoding units and, therefore, ensure that is above the predefined ratio of encoding units.

The barcode standard or pre-known specification may be configured to generate a Quick Response (QR) barcode. However, other types of two-dimensional barcodes and even one-dimensional barcodes may be considered in the context of the proposed methods. Details about this are provided in other parts of the description.

The splitting of the predefined set of reference colours may comprise identifying reference colours with "excessive" proximity to the first contrast threshold and randomly distributing (at least some of) said reference colours between the set of reference dark colours and the set of reference light colours. A predefined proximity threshold may be used to this end, so that when a given reference colour exceeds the proximity threshold, said reference colour may be assumed as having "doubtful" darkness and/or lightness because of its excessive proximity to the first contrast (or splitting) threshold. This feature in combination with the aforementioned error correction mechanism may increase the possibilities of successful standard decoding of the barcode with the embedded colour palette.

In a further aspect, a computer program is provided comprising program instructions for causing a computing system to perform any of the previous methods for generating a barcode with an embedded colour palette for colour correction. This computer program may be embodied on a storage medium and/or carried on a carrier signal.

In a still further aspect, a system is provided for generating a barcode with an embedded colour palette for colour correction of a captured image in digital format. This system comprises a generating module, a splitting module, a modifying module and an updating module. The generating module is configured to generate an initial barcode according to a barcode standard or pre-known specification, the initial barcode being formed by a plurality of encoding units each having a predetermined position in the barcode, and the plurality of encoding units including light colour encoding units and dark colour encoding units jointly encoding a reference to a storage location for storing data of the barcode. The splitting module is configured to split a predefined set of reference colours for colour correction into a set of reference dark colours and a set of reference light colours depending on a first contrast threshold. The modifying module is configured to modify, according to one or more predefined replacement criteria, the initial barcode by replacing, for each of at least some of the reference dark colours, a dark colour encoding unit by the reference dark colour, and replacing, for each of at least some of the reference light colours, a light colour encoding unit by the reference light colour. The updating module is configured to update the data of the storage location with data representing the reference colours included in the modified barcode and corresponding positions in the barcode attributed to said reference colours in the modified barcode.

As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (associated to the portable device) instead of or in addition to the function performed at the described particular module.

Further, the modules may be implemented across multiple devices (associated to the portable device) and/or other components local or remote to one another. Additionally, the modules may be moved from one device and added to another device, and/or may be included in both devices (associated to the portable device). Any software implementations may be tangibly embodied in one or more storage media, such as, for example, a memory device, a floppy disk, a compact disk (CD), a digital versatile disk (DVD), or other devices that may store computer code.

In a yet further aspect, a computing system is provided for generating a barcode with an embedded colour palette for colour correction of a captured image in digital format. This computing system comprises a memory and a processor, embodying instructions stored in the memory and executable by the processor. The instructions comprise functionality to execute any of the previous methods for generating a barcode with an embedded colour palette for colour correction.

In an additional aspect, a method is provided for producing a barcode with an embedded colour palette for colour correction. This method comprises generating a barcode with an embedded colour palette by performing any of the previously described "generation" methods, and producing said generated barcode with embedded colour palette. Printing techniques or any other method of colouring a suitable substrate may be used to this end. A barcode with an embedded colour palette for colour correction produced by performing said method (of producing a barcode with an embedded colour palette) may also be provided.

In a still additional aspect, a method is provided for colour correction of a captured image included in a captured scene in digital format, wherein the captured scene results from a capture of the scene comprising the image and a barcode with an embedded colour palette generated by performing any of the previous barcode generating methods. The image includes real image colours and the barcode with embedded colour palette includes real reference colours. The captured scene comprises the captured image and the captured barcode with embedded colour palette, the captured image including apparent image colours (as seen in the captured image) and the captured barcode with embedded colour palette including apparent reference colours (as seen in the captured barcode with embedded colour palette).

The correction method comprises identifying the captured barcode with embedded colour palette in the captured scene, and decoding the captured barcode with embedded colour palette according to the barcode standard or pre-known specification used to generate the barcode with embedded colour palette. Said decoding produces corresponding reference to storage location where data of the barcode with embedded colour palette is stored. The method further comprises accessing the storage location through the determined reference to storage location, so as to retrieve the real reference colours in the barcode with embedded colour palette and corresponding positions of the real reference colours in the barcode with embedded colour palette. The method still further comprises identifying the apparent reference colours in the captured barcode with embedded colour palette, based on the retrieved positions of the real reference colours in the barcode with embedded colour palette, and determining, for each of (at least some of) the real reference colours, a colour deviation between the real reference colour and the corresponding apparent reference colour. The method yet further comprises performing colour correction of the captured image by adjusting the apparent image colours depending on the determined colour deviations between real and apparent reference colours.

The decoding of the captured barcode with embedded colour palette may comprise binarizing the captured barcode (with embedded colour palette) and decoding said binarized barcode (with embedded colour palette) according to the barcode standard or pre-known specification. This binarization may be performed by converting the apparent reference colours (as seen in the captured barcode) to dark or light colour(s) depending on whether corresponding apparent reference colour is respectively below or above a second contrast threshold. This second contrast threshold may be defined in terms of e.g. colour luminance, colour brightness, grayscale value or any scalar value of colour information accounting a difference in luminosity between colours. Such a binarization prior to the decoding of the captured barcode (with embedded colour palette) may increase the possibilities of successful (standard) decoding of the captured barcode and, therefore, accurate determination of corresponding reference to storage location may be best ensured.

The correction method may further comprise verifying whether the decoding of the binarized barcode (with the embedded colour palette) produces an erroneous condition and, in case of erroneous condition, a loop may be iteratively performed according to one or more predefined iteration criteria. Every iteration of said loop may comprise varying the second contrast threshold, the aforementioned binarization taking into account said varied second contrast threshold, and the aforementioned decoding of the captured barcode once binarized. The one or more predefined iteration criteria may comprise performing iterations of the loop until the erroneous condition is not produced by the decoding of the binarized barcode in corresponding iteration. The erroneous condition may comprise the production, by the decoding of the binarized barcode, of an output not satisfying a predefined format that any reference to storage location is expected to satisfy. Additionally or alternatively, the erroneous condition may comprise the production, by the decoding of the binarized barcode, of a decoding error according to the barcode standard or pre-known specification. Such an iterative approach may further increase the possibilities of successful decoding of the captured barcode and, therefore, accurate determination of the corresponding reference to the storage location may be best ensured.

As described in other parts of the description, the barcode with the embedded colour palette may comprise one or more replicas of one or more of the real reference colours. In these circumstances, the determination of the colour deviations between real and apparent reference colours may comprise determining, for each of (at least some of) the replicated real reference colours, an average of the apparent reference colours corresponding to the replicated real reference colour, and determining a corresponding colour deviation between the averaged apparent reference colours and the replicated real reference colour. Additionally or alternatively, the determination of the colour deviations between real and apparent reference colours may comprise determining, for each of at least some of the replicated real reference colours, a colour deviation (in the reference colour space) between the replicated real reference colour and each of the apparent reference colours corresponding to the replicated real reference colour. These features may compensate or attenuate distortions due to divergent light and/or capturing conditions differently affecting the captured scene.

In a yet additional aspect, a computer program is provided comprising program instructions for causing a computing system to perform any of the previous methods for colour correction of a captured image. Same or similar general principles as those discussed in relation to any computer program according to present disclosure may be of consideration in this particular computer program.

In a furthermore aspect, a system is provided for colour correction of a captured image included in a captured scene in digital format, the captured scene resulting from a capture of the scene comprising the image and a barcode with an embedded colour palette generated by performing any of the methods according to present disclosure. The image includes real image colours and the barcode with embedded colour palette includes real reference colours. The captured scene comprises the captured image and the captured barcode with embedded colour palette, the captured image including apparent image colours as seen in the captured image, and the captured barcode with embedded colour palette including apparent reference colours as seen in the captured barcode with embedded colour palette.

The system comprises an identifying module, a decoding module, an accessing module, a identifier module, a colour deviation module and a correcting module. The identifying module is configured to identify the captured barcode with embedded colour palette in the captured scene. The decoding module is configured to decode the captured barcode with embedded colour palette according to the barcode standard or pre-known specification used to generate the barcode with embedded colour palette, so as to determine the corresponding reference to storage location where data of the barcode with embedded colour palette is stored. The accessing module is configured to access the storage location through the determined reference to storage location, so as to retrieve the real reference colours in the barcode with embedded colour palette and corresponding positions of the real reference colours in the barcode with embedded colour palette. The identifier module is configured to identify the apparent reference colours in the captured barcode with embedded colour palette, based on the retrieved positions of the real reference colours in the barcode with embedded colour palette. The colour deviation module is configured to determine, for each of at least some of the real reference colours, a colour deviation between the real reference colour and the corresponding apparent reference colour. The correcting module is configured to perform colour correction of the captured image by adjusting the apparent image colours depending on the determined colour deviations between real and apparent reference colours. Same or similar general principles as those discussed in relation to other systems proposed in present disclosure may be of consideration in the system.

In a still furthermore aspect, a correction computing system is provided for colour correction of a captured image, the correction computing system comprising a memory and a processor, embodying instructions stored in the memory and executable by the processor. These instructions comprise functionality to execute any of the previously described methods for colour correction of a captured image. Same or similar general principles as those discussed in relation to other computing systems proposed in present disclosure may be of consideration in the correction computing system.

In a yet furthermore aspect, a sensor arrangement is provided for measuring (or sensing, detecting) an environmental or physical condition. This sensor arrangement comprises a barcode with an embedded colour palette generated by performing any of the barcode generation methods according to present disclosure and, furthermore, a colour variable unit including a material or substance having a colour changeable depending on the environmental or physical condition. Said changeable colour is thus correctable by performing any of the colour correction methods according to present disclosure, such that said corrected colour may be used to measure the environmental or physical condition. This measurement may be performed by e.g. inspecting or consulting a data structure implementing a correspondence between predefined colours and predefined environmental or physical conditions, to determine which of the predefined colours best matches the corrected colour. The predefined environmental or physical condition corresponding to said best matching predefined colour may then be outputted as the measured environmental or physical condition. The colour variable unit may be internal or external to the barcode with embedded colour palette. In case of internal colour variable unit, it may cover or correspond to e.g. one or more of the encoding units of the barcode with the embedded colour palette.

In another aspect, a sensor method is provided for measuring an environmental or physical condition depending on a captured sensor arrangement according to present disclosure, the captured sensor arrangement including corresponding captured colour variable unit and captured colour palette. The sensor method comprises performing colour correction of the captured colour variable unit by performing any of the colour correction methods according to present disclosure (taking into account the reference colours in the captured colour palette), and measuring the environmental or physical condition based on the corrected colour of the captured colour variable unit.

The present disclosure provides means for many measuring or sensing applications including colour correction of corresponding captured image and/or colour variable unit. Examples of said sensing applications are cited below.

Some applications may be based on e.g. measuring colour in a captured image or colour variable unit. For example, analytical applications based on colorimetry may be implemented by inserting reagents in a colour variable unit, capturing (a photo of) the colour variable unit and the barcode with the embedded colour palette, correcting the colour of the captured colour variable unit, and analysing the corrected colour based on colorimetry techniques to infer a quantity or measurement of resulting analytes. One or another corrected colour may indicate one or another quantity of resulting analytes which, in turn, may induce one or another analytical "conclusion". Examples of such applications may include determining conservation degree of food in a recipient, measuring safety in environments with toxic gases, monitoring emissions of environmental gases, monitoring diabetes by measuring acetone in breath, screening of pathologies by measuring substances in breath (e.g. oesophagus cancer), etc. Other examples may be based on placing the barcode with embedded colour palette in the vicinity of a "target" sample to perform colour correction and corresponding measurement of the corrected colour, in order to measure the sample depending on the corrected colour. Reactive strips may be used as colour variable unit to contain the target sample, such as e.g. strips for measuring chlorine and pH in swimming pools, urinary strips, etc. Further examples may include quality control in production of articles whose colour(s) may be relevant (textiles, ceramics . . . ), augmented reality applications in which an object may be inserted in a virtual scene with colours adapted to lighting conditions of that scene and/or with elimination or attenuation of distortion(s) caused by the image capturing device. Yet further examples may include cosmetic applications, such as e.g. determining the tone of the skin for selection of make-up tones, monitoring the effectiveness of depigmenting cosmetic treatments, etc. Additional examples may include early diagnosis of jaundice (skin and eyes become more yellowish due to an increase in bilirubin), screening for pancreatic cancer in adults by monitoring skin colour and eyes, etc. Jaundice is quite common in neonates in the first days of life and may require medical attention.

Further applications may be based on obtaining standardized colour images. Examples of such applications may include e.g. early diagnosis of skin cancer, based on detecting the presence of certain colours in the examined lesion which may be crucial to the diagnosis. This approach may be applied to e.g. tele-dermatology to permit medical specialist to decide about prioritization of patients based on images taken in primary care consultation, and periodic monitoring of risk patients by the dermatologist by comparing pertinent images. Other examples may comprise e.g. monitoring of pathologies in dermatology (vitiligo, inflammatory pathologies such as dermatitis or psoriasis, etc.), image standardization in clinical trials in dermatology, histology (standardization of colour in the images of samples that are stored, wherein colour is very relevant since samples are normally stained). Further examples may include ulcers monitoring and treatment selection, surgical wound monitoring, ophthalmology (monitoring of some pathologies), E-commerce (obtaining of realistic images and colour standards for products in which this feature may be decisive, e.g. furniture, make-up, paint, etc.).

BRIEF DESCRIPTION OF THE DRAWINGS

Non-limiting examples of the present disclosure will be described in the following, with reference to the appended drawings, in which.

EXAMPLES

Figure 1:
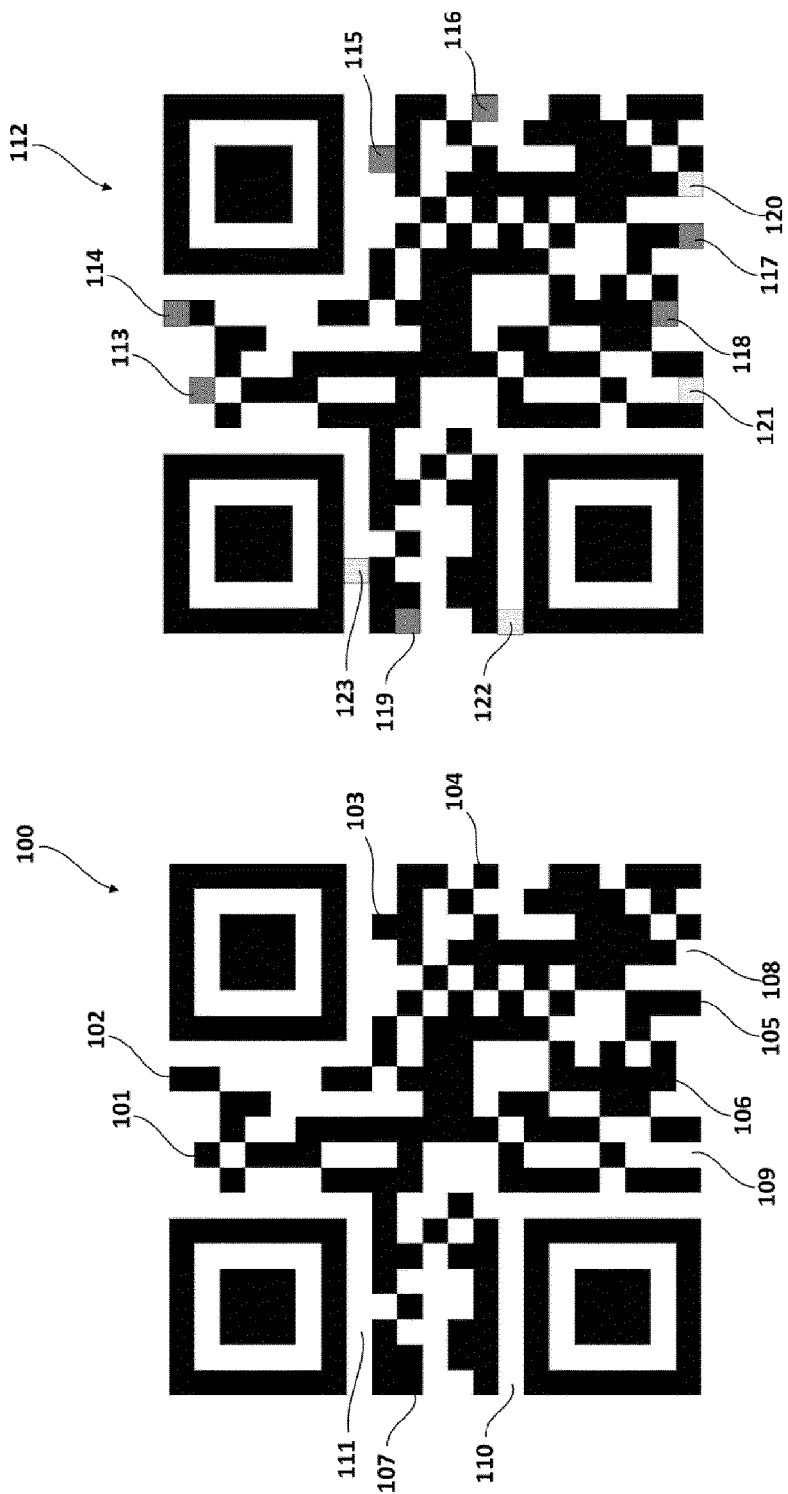
FIG. 1 is a schematic representation of a standard two-dimensional barcode encoding a reference to storage location and a modified version of said barcode corresponding to a barcode with an embedded colour palette according to some examples.

FIG. 1 is a schematic representation of a standard machine readable two-dimensional barcode 100 encoding a reference to storage location and a modified version 112 of said barcode 100 including a colour palette according to some examples. The standard two-dimensional (2D) barcode 100 may be generated by using any known method/software configured to generate two-dimensional barcodes according to a given standard or specification. The 2D barcode 100 may e.g. take into account black and white colours or any other pair of "encoding" colours with significant contrast difference between them so that said "encoding" colours are clearly distinguishable from each other. For example, navy blue and yellow colours could be used instead of typical black and white colours.

The expression "barcode standard" is used herein to refer to any pre-known requirements or specification according to which barcodes are generable and decodable. Therefore, a "barcode standard" may simply refer to any (standard or non-standard) way of generating and decoding barcodes with the general purpose of representing coded information and obtaining said information through pertinent decoding. In the present disclosure, said (known) manners of generating and decoding information in the form of a barcode are re-used to include a further functionality for colour correction. In other words, the suggested "barcodes with embedded colour palette" provide a double functionality of encoding a reference to storage location (first functionality) and the provision of reference colours for colour correction (second functionality).

The particular examples described herein refer to 2D barcodes. However, 1D barcodes may also be used according to Same or similar general principles as those proposed with respect to 2D barcodes. Similarly, even though the disclosed examples refer to QR codes, other types of 2D barcodes may be used in alternative implementations to those based on QR barcodes. Examples of 1D barcodes that could be used to implement the herein proposed "barcodes with embedded colour palette" are EAN-8, EAN-13, UPC-A, etc. Examples of 2D barcodes (other than QR codes) that are usable to implement the suggested "barcodes with embedded colour palette" are Data Matrix, Aztec Code, etc.

The standard 2D barcode 100 may include dark colour encoding units 101-107 and light colour encoding units 108-111. Dark "encoding" colour may be e.g. black, navy blue, etc. and light "encoding" colour may be e.g. white, yellow, etc. In the particular example shown, the standard 2D barcode is a QR barcode (Quick Response code) including black squared encoding units 101-107 and white squared encoding units 108-111.

The standard 2D barcode 100 may be generated to encode any type of reference to a storage location, such as e.g. a link, ID, URL or any relevant information that may be coded in ASCII, UTF, etc. so that the storage location is accessible through said reference encoded by the standard 2D barcode 100. Data about corresponding colour palette embedded in the barcode 100 may be stored in said storage location.

As shown in FIG. 1, some dark (e.g. black) encoding units 101-107 may be replaced by corresponding dark reference colours (for colour correction) 113-119, and some light (e.g. white) encoding units 108-111 may be replaced by corresponding light reference colours (for colour correction) 120-123. This may permit generating a modified 2D barcode 112 with a double function of encoding the reference to storage location (first function) and, furthermore, providing colours of reference for colour correction (second function). Modified 2D barcode 112 may also be referred herein to as barcode with embedded colour palette (or reference colours).

Figure 2:
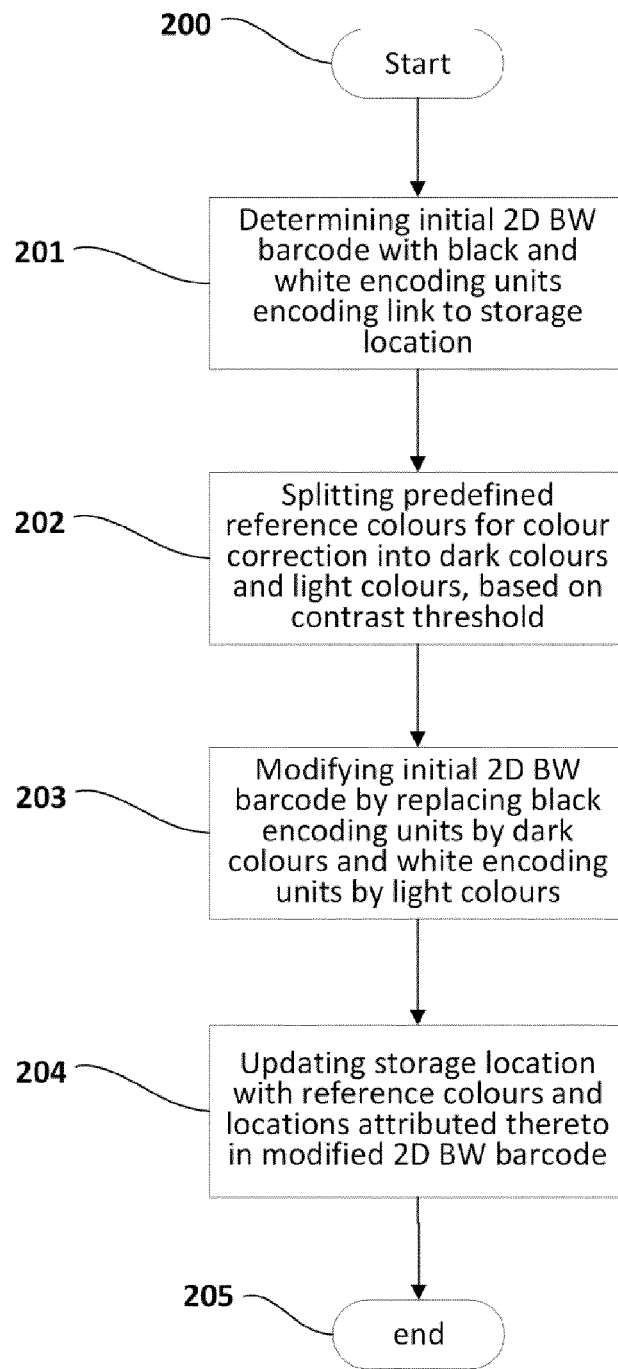
FIG. 2 is a flowchart schematically illustrating methods according to examples for generating a barcode with an embedded colour palette of same or similar type as the one illustrated by FIG. 1.

FIG. 2 is a flowchart schematically illustrating methods according to examples for generating a barcode with an embedded colour palette for colour correction of a captured image in digital format, which may be of same or similar type as the barcode with colour palette illustrated by FIG. 1. Number references from FIG. 1 may be re-used in following description of FIG. 2.

At block 200, the method may be started as a result of e.g. receiving a petition requesting initiation of the method. This request may be automatically generated e.g. when a user of the method causes production of a starting signal.

At block 201, the method may comprise generating (or determining) an initial two-dimensional (2D) black and white (BW) barcode 100 according to a 2D BW barcode standard. The initial 2D BW barcode 100 may comprise a plurality of encoding units each having a predetermined position in the barcode, and the plurality of encoding units including white encoding units 108-111 and black encoding units 101-107 jointly encoding a reference to a storage location for storing data of corresponding barcode with the embedded colour palette. Alternatively, other pairs of "encoding" colours with significant contrast difference between them may be used instead of black and white colours. For instance, the 2D barcode 100 could comprise first colour, e.g. blue navy, and second colour, e.g. yellow, encoding units instead of more typical black and white encoding units.

At block 202, the method may comprise splitting a predefined set of reference colours for colour correction into a set of reference dark colours 113-119 and a set of reference light colours 120-123 depending on a (predefined) first contrast threshold. In some examples, the predefined set of reference colours may correspond to colours of a (preexisting) general purpose colour palette for colour correction. Alternatively, the set of reference colours may be identified from a range of colours that are representative of a type of images to be captured and colour-corrected. This range of colours may be identified by e.g. colour sampling a plurality of example (or test) images that are representative of the type of images to be captured and colour-corrected. Then, salient colours in the range of colours may be identified and said salient colours may be assumed as the (predefined) set of reference colours. Salient colours may be identified by e.g. clustering the colours of the range of colours. This clustering may be performed according to any known clustering technique, such as e.g. k-means. The first contrast threshold may correspond to a threshold predefined in terms of e.g. colour luminance, colour brightness, grayscale value or any scalar value of colour information accounting a difference in luminosity between colours, which is suitable to discern between darkness and lightness of the reference colours.

At block 203, the initial 2D BW barcode 100 (from block 201) may be modified in same or similar manner as shown in FIG. 1. In particular, the initial 2D BW barcode 100 may be modified by replacing, according to predefined replacement criteria, black encoding units 101-107 by dark reference colours 113-119 and white encoding units 108-111 by light reference colours 120-123. The predefined replacement criteria may comprise e.g. a random selection of black and white encoding units to be replaced by corresponding dark and light reference colours. Other replacement criteria may be used depending on e.g. spatial location or position of the encoding units to be replaced, predefined selectivity of encoding units to be replaced, etc. Replacement criteria based on spatial location may include e.g. sequentially selecting encoding units (to be replaced) according to left-right and top-down directions, left-right and bottom-up directions, right-left and top-down directions, etc. Replacement criteria based on predefined selectivity may include e.g. selecting encoding units (to be replaced) that are defined as selectable for their substitution, whereas other encoding units cannot be selected because they are not defined as selectable.

At block 204, the storage location may be updated with data representing the reference colours 113-123 included in the modified 2D BW barcode 112 and corresponding positions (or locations) in the barcode attributed to said reference colours 113-123 in the modified 2D BW barcode 112. These data stored in the storage location associated with the barcode with embedded reference colours 112 may be used to effectively perform colour correction as described in other parts of the disclosure.

At block 205, the execution of the method may be ended by e.g. providing the generated barcode with the embedded colour palette 112 to corresponding receptor, such as e.g. a competent user.

Figure 3:
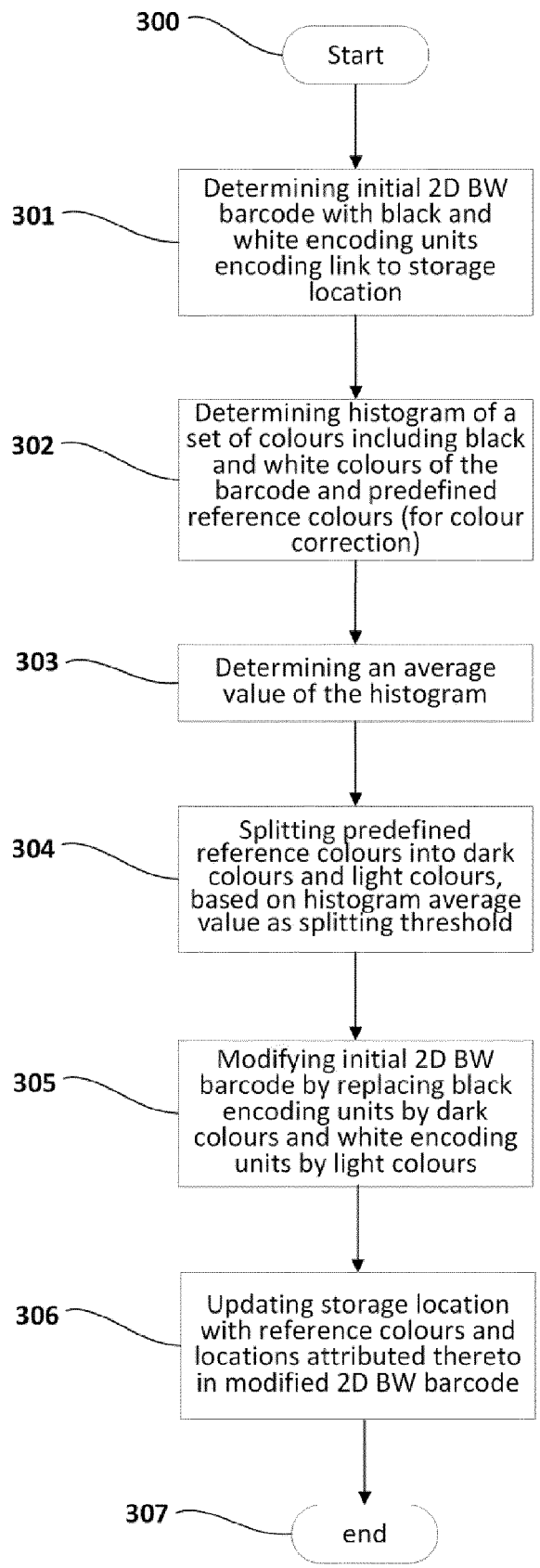
FIG. 3 is a flowchart schematically illustrating methods according to further examples for generating a barcode with an embedded colour palette of same or similar type as the one illustrated by FIG. 1.

FIG. 3 is a flowchart schematically illustrating methods, according to other examples, for generating a barcode with an embedded colour palette for colour correction of a captured image in digital format, which may be of same or similar type as the barcode with colour palette illustrated by FIG. 1. Number references from FIG. 1 may be re-used in following description of FIG. 3.

The methods illustrated by FIG. 3 are similar to the methods of FIG. 2 with a main difference residing in that the first contrast threshold is determined depending on a histogram of black (dark) and white (light) colours of the initial 2D BW barcode 100 along with reference colours 113-123. Blocks 300, 301, 305, 306 and 307 of FIG. 3 may be equal or similar as blocks 200, 201, 203, 204 and 205 of FIG. 2, respectively.

At block 302, the method may comprise generating (or determining) a histogram of a set of colours formed by the black/dark and white/light colours of the initial 2D BW barcode 100 and the reference colours (for colour correction) 113-123. Any known method of generating a histogram from a set of colours may be utilized to this end.

At block 303, an average value of the histogram (from previous block 302) may be determined (or calculated). Said average value may be e.g. a median of the histogram, a mean of the histogram, a mode of the histogram or any "digest" value of the histogram denoting a central tendency thereof. Any known technique of determining an average value of a histogram may be utilized to the suggested purpose.

Block 304 may be similar to block 202 of FIG. 2 but with a difference consisting in that the reference colours are split into dark and light reference colours depending on the histogram average value (from block 303) as first contrast (or splitting) threshold. That is, reference colours that are above (or are equal to) the histogram average value may be classified as dark colours and reference colours that are below (or are equal to) the histogram average value may be classified as light colours.

In the cases wherein the initial 2D BW barcode 100 is generated (according to the 2D BW barcode standard) with threshold pixel(s) to be used by the standard to decode the barcode, said threshold pixel(s) may be updated with the histogram average value. This update may be performed e.g. at block 305 wherein the initial barcode is modified with dark and light reference colours. This feature may promote avoidance or reduction of errors when (standard) decoding the barcode with embedded reference colours 112, to obtain the reference to storage location, in the context of methods according to present disclosure.

An aspect of the above approaches based on histogram and its average value is that a very suitable first contrast (or splitting) threshold may be determined for reliably splitting the reference colours into dark and light reference colours. And this reliable splitting may induce the barcode with embedded colour palette 112 to be more effective in the sense that errors in its standard decoding may be avoided or minimized. In other words, the barcode with embedded colour palette 112 may be successfully standardly decodable in spite of the presence of reference colours (for colour correction).

In some examples, the 2D BW barcode standard may include an error correction mechanism to enforce that any 2D BW barcode generated according to the standard is globally decodable as long as a ratio of individually decodable encoding units (in the 2D BW barcode) is above a predefined ratio of encoding units. Taking this into account, the first contrast threshold (used in methods according to e.g. FIGS. 2 and 3) may be adjusted so as to induce satisfaction of said condition regarding the predefined ratio of encoding units. An iterative approach may be used to iteratively varying the first contrast (or splitting) threshold until a ratio of individually decodable encoding units is found to be above the predefined ratio of encoding units. Any maximization technique or algorithm may also be used to determine an adjustment of the first contrast threshold that maximizes a ratio of individually decodable encoding units above the predefined ratio of encoding units. This adjustment of the first contrast (or splitting) threshold may promote successful standard decoding of the modified 2D BW barcode even in the case that black/white encoding units have not been replaced "accurately" enough by corresponding reference colours. In other words, improper substitutions of black/white encoding units by reference colours may be "absorbed" (or compensated) by the error correction mechanism of the 2D BW barcode standard.

According to some implementations, the predefined set of reference colours (used to generate the barcode with embedded colour palette 112) may include replicas of at least some of the reference colours. This may increase the reliability of the barcode with embedded palette 112 when used in methods such as those described in other parts of the disclosure, since different instances of same reference colours are spatially distributed within the barcode 112. This spatial distribution of same colours may promote compensation of different light and/or capturing conditions affecting said spatially distributed reference colours in the barcode 112.

In some barcode generating methods according to the present disclosure, the splitting of the predefined set of reference colours may comprise identifying reference colours with excessive proximity to the first contrast (or splitting) threshold. This excessive proximity may be determined depending on e.g. a predefined proximity threshold that when exceeded by corresponding reference colour, said reference colour may be classified as being of "doubtful" darkness/lightness. It is thus likely that these doubtful colours may lead to distortions when (standard) decoding the barcode. However, any distortion in (standard) decoding the barcode with embedded colour palette 112 due to said "doubtful" darkness/lightness may be absorbed or compensated by the (adjusted) error correction mechanism described before. From this fact it follows that the assignment of "doubtful" reference colours to corresponding light/white or dark/black encoding units may not be critical when such an error correction mechanism is available.

In some cases, the 2D BW barcode standard may be configured to generate restricted units which may have no encoding purpose and, hence, may not be covered by the error correction capabilities of the error correction mechanism. However, such restricted units may play a critical role in the standard decoding of the barcode, e.g. in optical recognition steps of corresponding standard decoding algorithm(s). Implementations including the aforementioned identification of "doubtful" reference colours may avoid assigning "doubtful" colours to said restricted units. This may thus contribute to produce a barcode with an embedded colour palette 112 that is effectively decodable according to the 2D BW barcode standard or pre-known specification.

Barcodes with embedded colour palette may be provided according to modified barcodes resulting from barcode generating methods such as the ones described with reference to FIGS. 2 and 3. Said barcodes with embedded colour palette 112 may be produced by e.g. using printing techniques or any other method/technique of painting, colouring a suitable substrate (e.g. paper).

Sensor arrangements may also be provided for measuring (or detecting) an environmental or physical condition. A sensor arrangement of this type may comprise any of the above barcodes with embedded reference colours and a colour-variable unit including a material or substance that changes its colour depending on the environmental or physical condition. This colour variable unit may be expressly identified as a "differentiated" unit taking into account its sensor function as opposed to the colour-correction function of the reference colours. To this end, especial identifier data may be used to distinguish said colour variable unit from reference colour units. Said especial identifier data may be accordingly stored in pertinent storage location and used to process the varying colour of said differentiated unit. The colour variable unit may be internal to the barcode, in which case e.g. the colour variable unit may be (or cover) one or more of the encoding units forming the barcode. The encoding unit(s) constituting (or being covered by) the colour variable unit may not include any restricted unit (in the terms described before) to avoid distortions when (standardly) decoding the barcode with embedded colour palette. In alternative configurations, the colour variable unit may be external to the barcode and may therefore be treated as if it were the captured image to be colour-corrected. The changeable colour may be corrected by performing same or similar colour correction methods as the ones described in present disclosure, i.e. depending on the reference colours in the barcode with embedded colour palette. Once colour correction has been performed, the environmental or physical condition may be measured (or detected) depending on the corrected colour of the colour variable unit. To this end, any type of data structure implementing or containing an equivalence (or correspondence, correlation, etc.) between corrected colour and environmental or physical condition may be used. For example, a table may be employed which includes e.g. a colour column and a condition column along with as many rows as needed to store different instances of colour-condition correlations or equivalences. This table may be e.g. a lookup table or any other type of data structure that may be stored in corresponding memory, database, filesystem, etc.

Barcode generation systems may be provided which are suitable for performing barcode generation methods such as the ones described in other parts of the disclosure. Said systems may be implemented by computing means, electronic means or a combination thereof. The computing means may be a set of instructions (that is, a computer program) and then the system may comprise a memory and a processor, embodying said set of instructions stored in the memory and executable by the processor. The instructions may comprise functionality to execute same or similar methods such as the ones described herein.

In case a system is implemented only by electronic means, the controller may be, for example, a CPLD (Complex Programmable Logic Device), an FPGA (Field Programmable Gate Array) or an ASIC (Application-Specific Integrated Circuit).

In case a system is a combination of electronic and computing means, the computing means may be a set of instructions (e.g. a computer program) and the electronic means may be any electronic circuit capable of implementing the corresponding step or steps of corresponding methods.

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of corresponding methods. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, corresponding methods.

Figure 4:
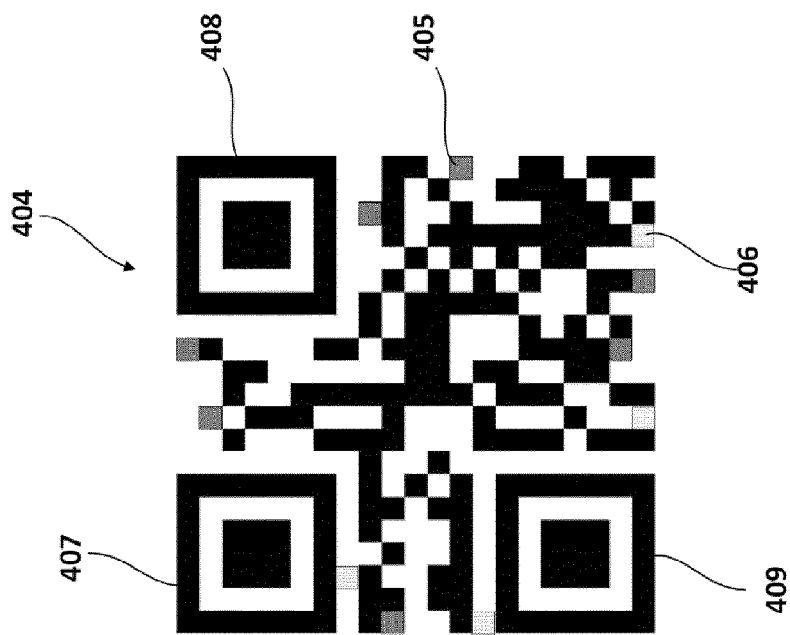
FIG. 4 is a schematic representation of a captured scene in digital format including a captured image and a captured barcode with embedded colour palette of same or similar type as the one illustrated by FIG. 1 and/or generated by same or similar methods as those illustrated by FIGS. 2 and 3.
Figure 4:
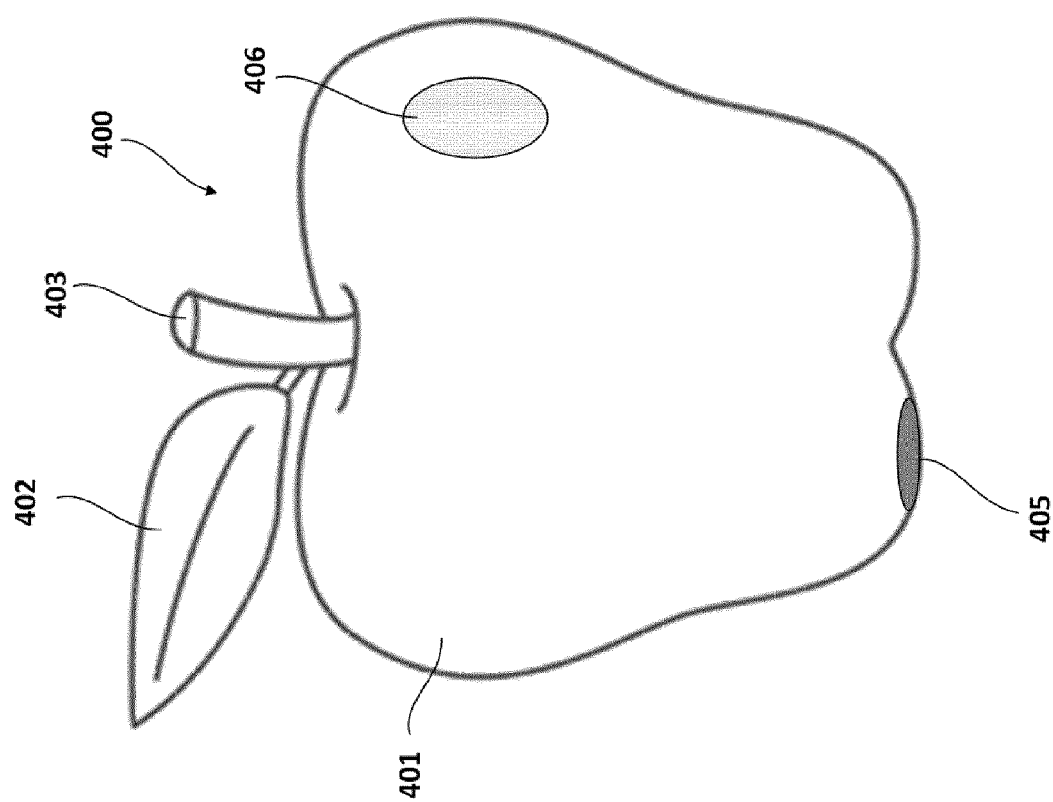

FIG. 4 is a schematic representation of a captured scene in digital format including a captured image 400 and a captured barcode with embedded colour palette 404 of same or similar type as the one shown in FIG. 1. The barcode with embedded colour palette 404 may have been determined by performing same or similar methods as those illustrated by FIGS. 2 and 3.

The captured scene in digital format may be obtained by using any known digital capturing device (e.g. a digital photographic camera) to capture a real scene including a real image and a real barcode with colour palette arranged in the vicinity of the real image. The real scene may also be captured by using an analogical capturing device and resulting captured scene may be digitalized by using any known method aimed at that purpose.

In the particular example illustrated, the real image corresponds to an apple and the real barcode with embedded colour palette corresponds to same or similar modified barcode 112 as the one shown in FIG. 1. The barcode with embedded colour palette 112 may have been determined by performing same or similar methods as the ones described with reference to FIGS. 2 and 3. The real barcode with embedded colour palette may comprise real reference colours for colour correction. Colours of the real image may be referred to as real image colours.

The captured image 400 may include apparent image colours corresponding to the real image colours as seen in the captured image. Apparent image colours may include, for example, different red levels 401 mainly corresponding to the apple itself, different brown levels 403 mainly corresponding to a stem of the apple, different green levels 402 mainly corresponding to a leaf of the stem, etc.

The captured barcode with embedded colour palette 404 may correspond to e.g. a captured QR code with embedded reference colours (for colour correction) 405, 406. The captured barcode with embedded colour palette 404 may comprise apparent reference colours 405, 406 corresponding to real reference colours as seen in the captured barcode 404.

Apparent reference colours in the captured barcode with embedded colour palette 404 may be equal or similar to apparent colours in the captured image 400. In the particular example illustrated, apparent colour 405 in the captured barcode 404 is shown similar to apparent colour 405 in captured image 400, and apparent colour 406 in the captured barcode 404 is shown similar to apparent colour 406 in captured image 400.

A captured scene such as the one of FIG. 4 may be an input to methods according to present disclosure. Said methods may consider deviations between real and apparent colours of the colour palette 404 for colour correction of the captured image 400 in the case of colours in the captured image 400 substantially matching apparent reference colours in the captured colour palette 404. Interpolation techniques e.g. may be used to correct apparent image colours without similar reference colour in the palette 404 (i.e. apparent image colours that are halfway between two different apparent reference colours of the captured palette 404). Details about methods are provided with reference to FIGS. 5 and 6.

Figure 5:
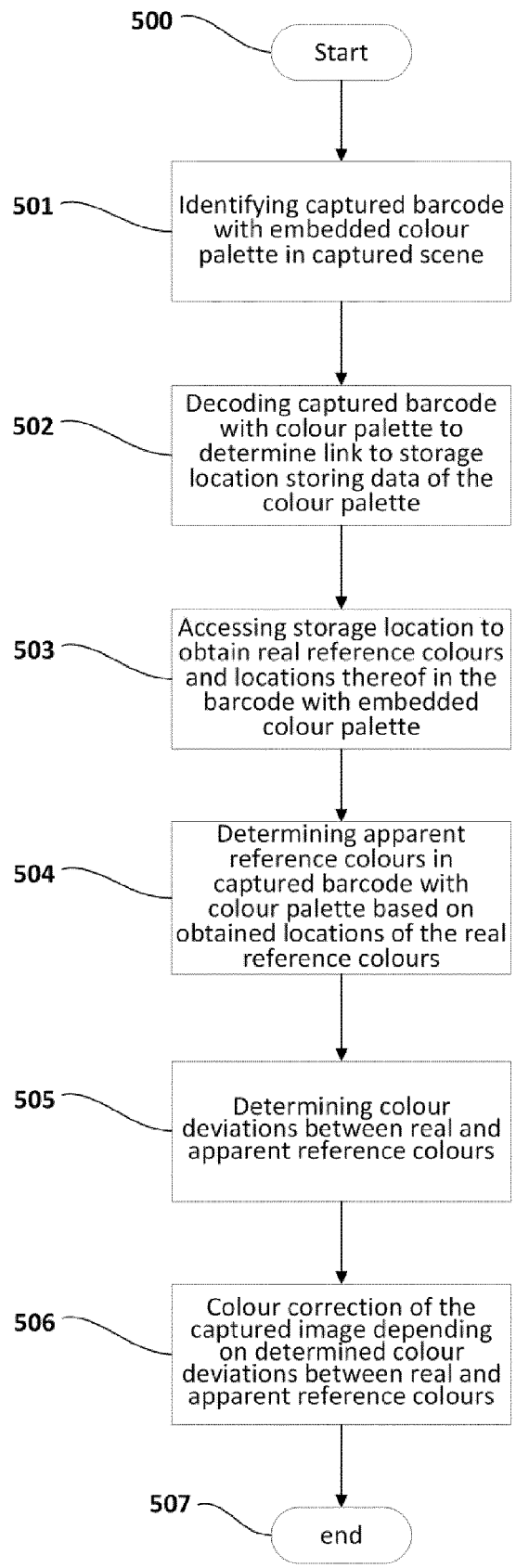
FIG. 5 is a flowchart schematically illustrating methods according to examples for colour correction of a captured image included in a captured scene of same or similar type as the one shown in FIG. 4.

FIG. 5 is a flowchart schematically illustrating methods according to examples for colour correction of a captured image included in a captured scene of same or similar type as the one shown in FIG. 4. Hence, number references from said FIG. 4 may be re-used in following description of FIG. 5.

At block 500, the method may be started as a result of e.g. receiving a petition requesting initiation of the method. This request may be automatically generated e.g. when a user of the method causes production of a starting signal.

At block 501, the captured barcode with embedded colour palette 404 may be (geometrically) identified in the captured scene. This may be performed depending on positional units included in the barcode 404 according to the standard that has been used to generate the barcode. These positional units may be employed by the standard to identify the position (and possibly the orientation) of the barcode 404 within the captured scene. In the particular example shown, three positional units 407-409 are indicated.

At block 502, the captured barcode with embedded colour palette 404 may be decoded according to the 2D BW barcode standard (that has been used to generate the barcode with colour palette 404) so as to determine (or obtain) the corresponding reference to storage location where data of the barcode 404 is stored. This may be performed by using any (pre-existing) software that implements the standard decoding of barcodes (according to the 2D BW barcode standard or pre-known specification).

At block 503, the method may include accessing the storage location through the determined reference to storage location that has resulted from the decoding of the captured barcode with embedded colour palette 404 (performed at block 502). This access may be carried out to retrieve the real reference colours of the colour palette and corresponding positions of the real reference colours in the barcode with embedded colour palette.

At block 504, the apparent reference colours in the captured barcode with embedded colour palette 404 may be determined (or identified) based on the retrieved positions (or locations) of the real reference colours in the colour palette. These locations may be represented by e.g. one or more points in a reference coordinate system, a cell number in a positional matrix of reference, etc. Once retrieved, said locations (or positions) in the captured barcode with colour palette 404 may be inspected to identify the apparent reference colours corresponding to the retrieved real reference colours. Therefore, this block 504 may finally output a set of colour pairs each including an apparent reference colour and its corresponding real reference colour.

At block 505, the method may process the colour pairs from block 504 to determine (or calculate), for each of (at least some of) the real reference colours, a colour deviation between the real reference colour and its corresponding apparent reference colour. A colour deviation between an apparent colour and corresponding real colour may be represented through e.g. a distance between colour coordinates of the apparent colour and colour coordinates of the real colour in a colour space of reference (e.g. RGB colour space).

At block 506, colour correction of the captured image may be performed by adjusting the apparent image colours depending on the determined colour deviations between real and apparent reference colours. Any apparent image colour substantially coinciding with an apparent reference colour may be corrected by applying (or transferring) the colour deviation between said apparent reference colour and corresponding real reference colour to the apparent image colour. Any apparent image colour not substantially coinciding with any of the apparent reference colours may be corrected by applying e.g. interpolation between least distant apparent reference colours and corresponding colour deviations.

At block 507, the execution of the method may be ended by e.g. providing the corrected image to corresponding receptor, such as e.g. a competent user, a controller of an imaging device or camera, etc.

Figure 6:
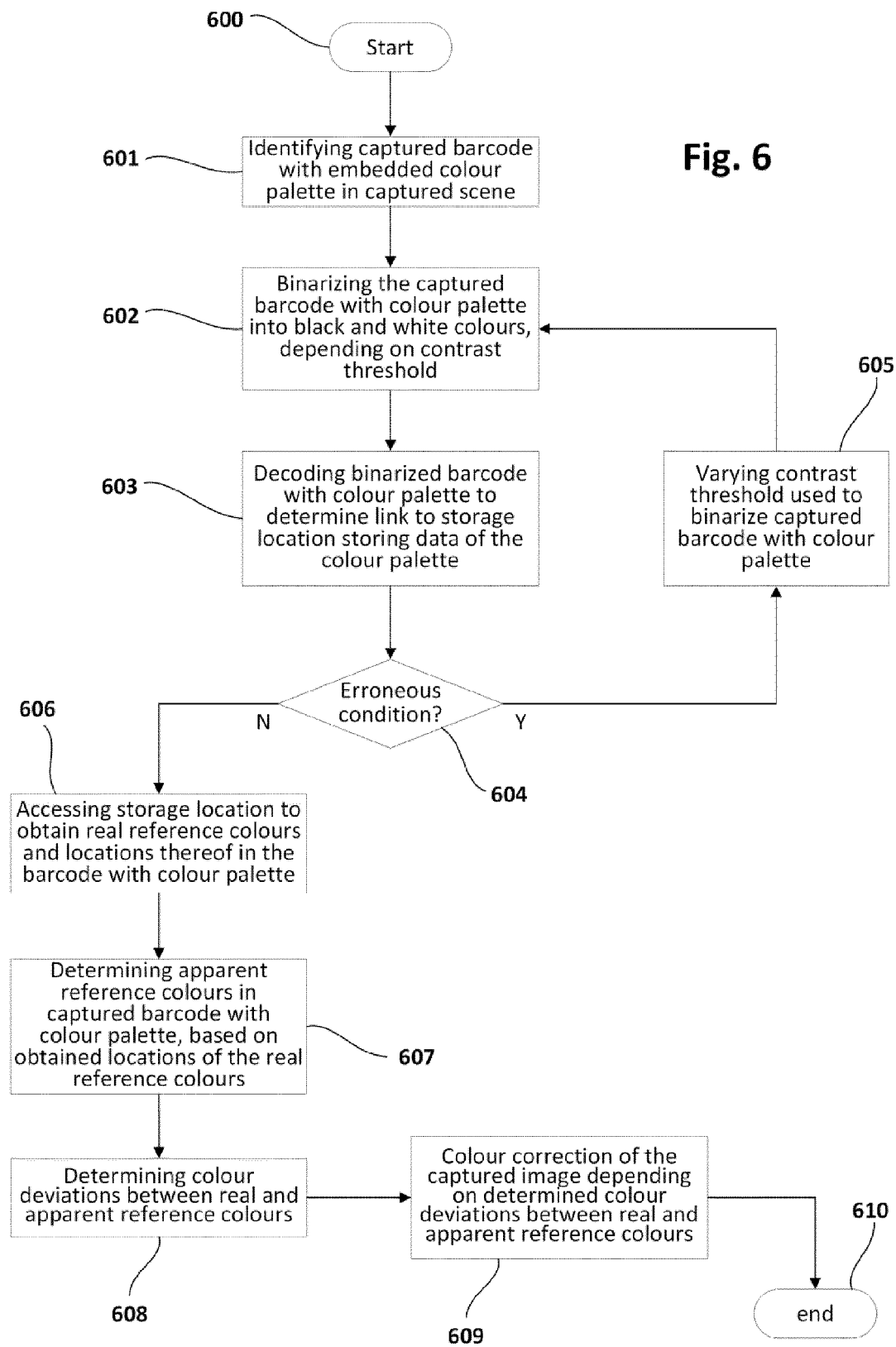
FIG. 6 is a flowchart schematically illustrating methods according to further examples for colour correction of a captured image included in a captured scene of same or similar type as the one shown in FIG. 4.

FIG. 6 is a flowchart schematically illustrating methods according to further examples for colour correction of a captured image included in a captured scene of same or similar type as the one shown in FIG. 4. Hence, number references from said FIG. 4 may be re-used in following description of FIG. 6.

The methods illustrated by FIG. 6 are similar to the methods of FIG. 5 with a main difference residing in the binarization of the captured barcode with colour palette 404 depending on a varying (second) contrast threshold. Blocks 600, 601, 606, 607, 608, 609 and 610 of FIG. 6 may be equal or similar as blocks 500, 501, 503, 504, 505, 506 and 507 of FIG. 5, respectively.

At block 602, the captured barcode with embedded colour palette 404 (identified at block 601) may be binarized into black and white colours (or any other pair of colours with sufficient contrast difference between them). This binarization may be performed depending on a potentially varying (second) contrast threshold. In particular, any apparent reference colour in the captured barcode 404 may be converted to black/dark colour if said apparent colour is above the (second) contrast threshold, or may be converted to white/light colour otherwise. The (second) contrast threshold may correspond to a threshold predefined in terms of e.g. colour luminance, colour brightness, grayscale value or any scalar value of colour information accounting a difference in luminosity between different colours, which is thus suitable to discern between darkness and lightness of the colours. The barcode with embedded colour palette 404 binarized in the proposed manner may result standardly decodable with reduced error propensity.

At block 603, the binarized barcode with embedded colour palette 404 may be decoded according to the 2D BW barcode standard to obtain corresponding reference (e.g. link, ID, URL . . . ) to storage location containing data about the barcode with embedded colour palette 404. The decoding of the binarized barcode 404 may be performed through any (pre-existing) software according to the considered 2D BW barcode standard. One difference between this block 603 and block 502 of FIG. 5 may reside in that the captured barcode 404 is binarized before its decoding, whereas, at block 502, the decoding is performed without previous binarization.

At block 604, a verification of whether the decoding performed at block 603 has produced an erroneous condition may be performed. In case of positive (or true) result of said verification, the method may proceed to block 605 for varying the second contrast threshold and subsequently trying (at block 602) a new binarization with the varied second contrast threshold and corresponding decoding (at block 603) of the binarized barcode. In case of negative (or false) result of said verification, the method may continue to block 606 for accessing the storage location through the reference that has resulted from the decoding performed at block 603. An erroneous decoding condition may comprise e.g. a decoding error yielded by the 2D BW barcode standard, dissatisfaction of a predefined format that any reference to storage location is expected to satisfy, etc.

In the case that the barcode with colour palette 404 includes some replicated real reference colours, the method may include determining (or calculating), for each of (at least some of) the replicated real reference colours, an average of the apparent reference colours corresponding to the replicated real reference colour. Then, said average may be used to determine corresponding colour deviation between the averaged apparent reference colours and the replicated real reference colour. This may increase the reliability of the method because different instances of same reference colours are spatially distributed within the barcode and, therefore, divergent light and/or capturing conditions differently affecting the replicated reference colours may be compensated.

As in the case of the barcode generation methods proposed herein, corresponding computer programs and (computing) systems may also be provided which are suitable to perform colour correction methods according to present disclosure. General principles commented with respect to computer programs and (computing) systems configured to perform barcode generation methods may be equally or similarly applied to computer programs and (computing) systems that are suitable to implement colour correction methods.

As described before, barcode generation methods and colour correction methods proposed herein may use different thresholds for identifying special situations depending on a variable magnitude. Such thresholds are used to e.g. discern between dark and light colours, detect excessive proximity between a reference colour and splitting threshold, etc. Said thresholds may be pre-established by performing experiments to determine from which value corresponding variable magnitude may denote special situation. These experiments may be based on e.g. calculations of test data and corresponding validation by a competent user to (continuously and/or regularly) refine the threshold. This refinement may be performed as many times as required along the life of corresponding method (and software/system) and depending on results provided by the method itself.

For reasons of completeness, various aspects of the present disclosure are set out in the following numbered clauses:

1. A method for generating a barcode with an embedded colour palette for colour correction of a captured image in digital format, the method comprising:

generating an initial barcode according to a barcode standard or pre-known specification, the initial barcode being formed by a plurality of encoding units each having a predetermined position in the barcode, and the plurality of encoding units including light colour encoding units and dark colour encoding units jointly encoding a reference to a storage location for storing data of the barcode;

splitting a predefined set of reference colours for colour correction into a set of reference dark colours and a set of reference light colours depending on a first contrast threshold;

according to one or more predefined replacement criteria, modifying the initial barcode by replacing, for each of at least some of the reference dark colours, a dark colour encoding unit by the reference dark colour, and replacing, for each of at least some of the reference light colours, a light colour encoding unit by the reference light colour;

updating the data of the storage location with data representing the reference colours included in the modified barcode and corresponding positions in the barcode attributed to said reference colours in the modified barcode.

2. A method according to clause 1, wherein the predefined set of reference colours correspond to colours of a general purpose colour palette for colour correction.

3. A method according to clause 1, further comprising determining the predefined set of reference colours, said determination comprising
determining a range of colours that are representative of a type of images to be captured and colour-corrected;
determining salient colours from the range of colours and determining said salient colours as the predefined set of reference colours.

4. A method according to clause 3, wherein determining the range of colours comprises colour sampling a plurality of example images that are representative of the type of images to be captured and colour-corrected.

5. A method according to any of clauses 3 or 4, wherein determining the salient colours from the range of colours comprises clustering the colours of the range of colours.

6. A method according to any of clauses 1 to 5, wherein the first contrast threshold is defined in terms of colour luminance, colour brightness, grayscale value or any scalar value of colour information accounting a difference in luminosity between colours.

7. A method according to any of clauses 1 to 6, wherein the one or more replacement criteria comprise a random selection of dark and light colour encoding units to be replaced by corresponding reference dark and light colours.

8. A method according to any of clauses 1 to 7, further comprising
generating a histogram of a set of colours including the dark and light colours of the initial barcode and the predefined reference colours; and
determining an average value of the histogram to be used as the first contrast threshold.

9. A method according to any of clauses 1 to 8, wherein the barcode standard or pre-known specification includes an error correction mechanism to enforce that any barcode determined according to the standard or pre-known specification is globally decodable as long as a ratio of individually decodable encoding units in said barcode is above a predefined ratio of encoding units; and wherein
the first contrast threshold is predefined or adjusted so as to induce that the ratio of individually decodable encoding units is above the predefined ratio of encoding units.

10. A method according to any of clauses 1 to 9, wherein the barcode standard or pre-known specification is configured to generate a Quick Response (QR) barcode.

11. A method according to any of clauses 1 to 10, wherein the predefined set of reference colours includes replicas of at least some of the reference colours.

12. A method according to any of clauses 1 to 11, wherein splitting the predefined set of reference colours comprises:
identifying reference colours with excessive proximity to the first contrast threshold depending on a predefined proximity threshold that when exceeded by corresponding reference colour, said reference colour is assumed as having excessive proximity to the first contrast threshold;
distributing at least some of said reference colours with excessive proximity to the first contrast threshold randomly between the set of reference dark colours and the set of reference light colours.

13. A computer program comprising program instructions for causing a computing system to perform a method according to any of clauses 1 to 12 for generating a barcode with an embedded colour palette for colour correction.

14. A computer program according to clause 13 embodied on a storage medium and/or carried on a carrier signal.

15. A system for generating a barcode with an embedded colour palette for colour correction of a captured image in digital format, the system comprising:
a generating module to generate an initial barcode according to a barcode standard or pre-known specification, the initial barcode being formed by a plurality of encoding units each having a predetermined position in the barcode, and the plurality of encoding units including light colour encoding units and dark colour encoding units jointly encoding a reference to a storage location for storing data of the barcode;
a splitting module to split a predefined set of reference colours for colour correction into a set of reference dark colours and a set of reference light colours depending on a first contrast threshold;
a modifying module to modify, according to one or more predefined replacement criteria, the initial barcode by replacing, for each of at least some of the reference dark colours, a dark colour encoding unit by the reference dark colour, and replacing, for each of at least some of the reference light colours, a light colour encoding unit by the reference light colour;
an updating module to update the data of the storage location with data representing the reference colours included in the modified barcode and corresponding positions in the barcode attributed to said reference colours in the modified barcode.

16. A computing system for generating a barcode with an embedded colour palette for colour correction of a captured image in digital format, the computing system comprising a memory and a processor, embodying instructions stored in the memory and executable by the processor, the instructions comprising functionality to execute a method according to any of clauses 1 to 12 for generating a barcode with an embedded colour palette for colour correction.

17. A method for producing a barcode with an embedded colour palette for colour correction, the method comprising:
determining a barcode with an embedded colour palette by performing a method according to any of clauses 1 to 12; and
producing the barcode with the embedded colour palette that has been determined by performing the method.

18. A barcode with an embedded colour palette for colour correction produced by performing a method according to clause 17.

19. A method for colour correction of a captured image included in a captured scene in digital format, the captured scene resulting from a capture of the scene comprising the image and a barcode with an embedded colour palette generated by performing a method according to any of clauses 1 to 12, the image including real image colours and the barcode with the embedded colour palette including real reference colours; wherein
the captured scene comprises the captured image and the captured barcode with the embedded colour palette, the captured image including apparent image colours as seen in the captured image, and the captured barcode with the embedded colour palette including apparent reference colours as seen in the captured barcode with the embedded colour palette; and wherein
the method comprises:
identifying the captured barcode with the embedded colour palette in the captured scene;
decoding the captured barcode with the embedded colour palette according to the barcode standard or pre-known specification used to generate the barcode with the embedded colour palette, so as to determine the corresponding reference to storage location where data of the barcode with the embedded colour palette is stored;
accessing the storage location through the determined reference to storage location, so as to retrieve the real reference colours in the barcode with the embedded colour palette and corresponding positions of the real reference colours in the barcode with the embedded colour palette;
identifying the apparent reference colours in the captured barcode with the embedded colour palette, based on the retrieved positions of the real reference colours in the barcode with the embedded colour palette;
determining, for each of at least some of the real reference colours, a colour deviation between the real reference colour and the corresponding apparent reference colour; and
performing colour correction of the captured image by adjusting the apparent image colours depending on the determined colour deviations between real and apparent reference colours.

20. A method according to clause 19, wherein decoding the captured barcode with the embedded colour palette comprises:
binarizing the captured barcode with the embedded colour palette by converting the apparent reference colours as seen in the captured barcode with the embedded colour palette to dark or light colour depending on whether corresponding apparent reference colour is respectively below or above a second contrast threshold; and
decoding the binarized barcode with the embedded colour palette according to the barcode standard or pre-known specification.

21. A method according to clause 20, wherein the second contrast threshold is defined in terms of colour luminance, colour brightness, grayscale value or any scalar value of colour information accounting a difference in luminosity between colours.

22. A method according to any of clauses 20 or 21, further comprising verifying whether the decoding of the binarized barcode with the embedded colour palette produces an erroneous condition; and wherein
in case of erroneous condition, a loop is iteratively performed according to one or more predefined iteration criteria, each iteration of the loop comprising
varying the second contrast threshold;
binarizing the captured barcode with the embedded colour palette taking into account said varied second contrast threshold; and
decoding said binarized captured barcode with the embedded colour palette.

23. A method according to clause 22, wherein the one or more predefined iteration criteria comprise performing iterations of the loop until the erroneous condition is not produced by the decoding of the binarized barcode with the embedded colour palette in corresponding iteration.

24. A method according to any of clauses 22 or 23, wherein the erroneous condition comprises the production, by the decoding of the binarized barcode with the embedded colour palette, of an output not satisfying a predefined format that any reference to storage location is expected to satisfy.

25. A method according to any of clauses 22 to 24, wherein the erroneous condition comprises the production, by the decoding of the binarized barcode with the embedded colour palette, of a decoding error according to the barcode standard or pre-known specification.

26. A method according to any of clauses 19 to 25, wherein the barcode with the embedded colour palette comprises one or more replicas of one or more of the real reference colours; and wherein determining the colour deviations between real and apparent reference colours comprises
determining, for each of at least some of the replicated real reference colours, an average of the apparent reference colours corresponding to the replicated real reference colour, and determining corresponding colour deviation between the averaged apparent reference colours and the replicated real reference colour; or
determining, for each of at least some of the replicated real reference colours, a colour deviation in the reference colour space between the replicated real reference colour and each of the apparent reference colours corresponding to the replicated real reference colour.

27. A computer program comprising program instructions for causing a computing system to perform a method according to any of clauses 19 to 26 for colour correction of a captured image.

28. A system for colour correction of a captured image included in a captured scene in digital format, the captured scene resulting from a capture of the scene comprising the image and a barcode with an embedded colour palette generated by performing a method according to any of clauses 1 to 12, the image including real image colours and the barcode with the embedded colour palette including real reference colours; wherein
the captured scene comprises the captured image and the captured barcode with the embedded colour palette, the captured image including apparent image colours as seen in the captured image, and the captured barcode with the embedded colour palette including apparent reference colours as seen in the captured barcode with the embedded colour palette; and wherein
the system comprises:
an identifying module to identify the captured barcode with the embedded colour palette in the captured scene;
a decoding module to decode the captured barcode with the embedded colour palette according to the barcode standard or pre-known specification used to generate the barcode with the embedded colour palette, so as to determine the corresponding reference to storage location where data of the barcode with the embedded colour palette is stored;
an accessing module to access the storage location through the determined reference to storage location, so as to retrieve the real reference colours in the barcode with the embedded colour palette and corresponding positions of the real reference colours in the barcode with the embedded colour palette;
a identifier module to identify the apparent reference colours in the captured barcode with the embedded colour palette, based on the retrieved positions of the real reference colours in the barcode with the embedded colour palette;
a colour deviation module to determine, for each of at least some of the real reference colours, a colour deviation between the real reference colour and the corresponding apparent reference colour; and a correcting module to perform colour correction of the captured image by adjusting the apparent image colours depending on the determined colour deviations between real and apparent reference colours.

29. A correction computing system for colour correction of a captured image, the correction computing system comprising a memory and a processor, embodying instructions stored in the memory and executable by the processor, the instructions comprising functionality to execute a method according to any of clauses 19 to 26 for colour correction of a captured image.

30. A sensor arrangement for measuring an environmental or physical condition, the sensor arrangement comprising:
   a barcode with an embedded colour palette generated by performing a barcode generation method according to any of clauses 1 to 12, and a colour variable unit including a material or substance having a colour changeable depending on the environmental or physical condition, wherein
   said changeable colour is correctable by performing a colour correction method according to any of clauses 19 to 26, and the environmental or physical condition is measurable depending on the corrected colour of the colour variable unit.

31. A sensor arrangement according to clause 30, wherein the colour variable unit is external to the barcode with the embedded colour palette.

32. A sensor arrangement according to clause 30, wherein the colour variable unit is internal to the barcode with the embedded colour palette.

33. A sensor arrangement according to clause 32, wherein the colour variable unit corresponds to one or more of the encoding units of the barcode with the embedded colour palette.

34. A sensor method for measuring an environmental or physical condition by using a captured sensor arrangement according to any of clauses 30 to 33 in digital format, the captured sensor arrangement including corresponding captured colour variable unit and captured colour palette, wherein the sensor method comprises:
   performing colour correction of the captured colour variable unit by performing a colour correction method according to any of clauses 19 to 26 taking into account the reference colours in the captured colour palette; and
   measuring the environmental or physical condition depending on the corrected colour of the captured colour variable unit.

35. A sensor method according to clause 34, wherein measuring the environmental or physical condition depending on the corrected colour of the captured colour variable unit comprises
   inspecting or consulting a data structure implementing a correspondence between predefined colours and predefined environmental or physical conditions, to determine which of said predefined colours best matches the corrected colour of the captured colour variable unit; and
   determining the predefined environmental or physical condition corresponding to said best matching predefined colour as the measured environmental or physical condition.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for generating a barcode with an embedded colour palette for colour correction of a captured image in digital format, the method comprising:
   generating an initial barcode according to a barcode standard or pre-known specification, the initial barcode being formed by a plurality of encoding units each having a predetermined position in the barcode, and the plurality of encoding units including light colour encoding units and dark colour encoding units jointly encoding a link to a storage location for storing data of the colour palette embedded in the barcode;
   splitting a predefined set of reference colours for colour correction into a set of reference dark colours and a set of reference light colours depending on a first contrast threshold;
   according to one or more predefined replacement criteria, modifying the initial barcode by replacing a respective one or more of the dark colour encoding units by one of the reference dark colours, and replacing a respective one or more of the light colour encoding units by one of the reference light colours;
   accessing the storage location through the link to the storage location and updating the storage location with data representing the reference colours included in the modified barcode and corresponding positions in the barcode attributed to said reference colours in the modified barcode.

2. A method according to claim 1, wherein the predefined set of reference colours correspond to colours of a general purpose colour palette for colour correction.

3. A method according to claim 1, wherein the first contrast threshold is defined in terms of colour luminance, colour brightness, grayscale value or any scalar value of colour information accounting a difference in luminosity between colours.

4. A method according to claim 1, wherein the one or more predefined replacement criteria comprise a random selection of dark colour and light colour encoding units to be replaced by corresponding reference dark and light colours.

5. A method according to claim 1, further comprising
   generating a histogram of a set of colours including the dark and light colours of the initial barcode and the predefined reference colours; and
   determining an average value of the histogram to be used as the first contrast threshold.

6. A method according to claim 1, wherein the barcode standard or pre-known specification includes an error correction mechanism such that any barcode determined according to the standard or pre-known specification is globally decodable as long as a ratio of individually decodable encoding units in said barcode is above a predefined ratio of encoding units; and wherein
   the first contrast threshold is predefined or adjusted such that the ratio of individually decodable encoding units is above the predefined ratio of encoding units.

7. A method for colour correction of a captured image included in a captured scene in digital format, the captured scene resulting from a capture of the scene comprising the image and a barcode with an embedded colour palette generated by performing a method according to claim 1, the image including real image colours and the barcode with the embedded colour palette including real reference colours; wherein the captured scene comprises the captured image and the captured barcode with the embedded colour palette, the captured image including apparent image colours as seen in the captured image, and the captured barcode with the embedded colour palette including apparent reference colours as seen in the captured barcode with the embedded colour palette; and wherein the method comprises:

identifying the captured barcode with the embedded colour palette in the captured scene;

decoding the captured barcode with the embedded colour palette according to the barcode standard or pre-known specification used to generate the barcode with the embedded colour palette, so as to determine the corresponding link to storage location where data of the colour palette embedded in the barcode is stored;

accessing the storage location through the determined corresponding link to the storage location, so as to retrieve the real reference colours in the barcode with the embedded colour palette and corresponding positions of the real reference colours in the barcode with the embedded colour palette;

identifying the apparent reference colours in the captured barcode with the embedded colour palette, based on the retrieved positions of the real reference colours in the barcode with the embedded colour palette;

determining, for each of at least some of the real reference colours, a colour deviation between the real reference colour and the corresponding apparent reference colour; and performing colour correction of the captured image by adjusting the apparent image colours depending on the determined colour deviations between real and apparent reference colours.

8. A method according to claim 7, wherein decoding the captured barcode with the embedded colour palette comprises:

binarizing the captured barcode with the embedded colour palette by converting the apparent reference colours as seen in the captured barcode with the embedded colour palette to dark or light colours depending on whether corresponding apparent reference colour is respectively below or above a second contrast threshold; and decoding the binarized barcode with the embedded colour palette according to the barcode standard or pre-known specification.

9. A method according to claim 8, further comprising verifying whether the decoding of the binarized barcode with the embedded colour palette produces an erroneous condition; and wherein responsive to the erroneous condition, a loop is iteratively performed according to one or more predefined iteration criteria, each iteration of the loop comprising varying the second contrast threshold;

binarizing the captured barcode with the embedded colour palette taking into account said varied second contrast threshold; and decoding said binarized captured barcode with the embedded colour palette.

10. A method according to claim 9, wherein the one or more predefined iteration criteria comprise performing iterations of the loop until the erroneous condition is not produced by the decoding of the binarized barcode with the embedded colour palette in a corresponding iteration.

11. A method according to claim 9, wherein the erroneous condition comprises the production, by the decoding of the binarized barcode with the embedded colour palette, of an output not satisfying a predefined format that any link to storage location is expected to satisfy.

12. A method according to claim 9, wherein the erroneous condition comprises the production, by the decoding of the binarized barcode with the embedded colour palette, of a decoding error according to the barcode standard or pre-known specification.

13. A method according to claim 7, wherein the barcode with the embedded colour palette comprises one or more replicas of one or more of the real reference colours; and wherein determining the colour deviations between real and apparent reference colours comprises determining, for each of at least some of the replicated real reference colours, an average of the apparent reference colours corresponding to the replicated real reference colour, and determining corresponding colour deviation between the averaged apparent reference colours and the replicated real reference colour; or determining, for each of at least some of the replicated real reference colours, a colour deviation in the reference colour space between the replicated real reference colour and each of the apparent reference colours corresponding to the replicated real reference colour.

14. A method of generating an environmental or physical condition sensor, the method comprising: providing a barcode with an embedded colour palette generated by performing a method according to claim 1, and a colour variable unit including a material or substance having a colour changeable depending on the environmental or physical condition.

15. A method according to claim 1, further comprising determining the predefined set of reference colours, said determination comprising determining a range of colours that are representative of a type of images to be captured and colour-corrected;

determining salient colours from the range of colours and determining said salient colours as the predefined set of reference colours.

16. A method according to claim 15, wherein determining the range of colours comprises colour sampling a plurality of example images that are representative of the type of images to be captured and colour-corrected.

17. A method according to claim 15, wherein determining the salient colours from the range of colours comprises clustering the colours of the range of colours.

18. A method according to claim 1, wherein splitting the predefined set of reference colours comprises:

identifying reference colours with excessive proximity to the first contrast threshold depending on a predefined proximity threshold that when exceeded by corresponding reference colour, said reference colour is assumed as having excessive proximity to the first contrast threshold; and distributing at least some of said reference colours with excessive proximity to the first contrast threshold randomly between the set of reference dark colours and the set of reference light colours.

19. A method according to claim 1, wherein the barcode standard or pre-known specification is configured to generate a Quick Response (QR) barcode.

20. A computing system for generating a barcode with an embedded colour palette for colour correction of a captured image in digital format, the computing system comprising a non-transitory memory and a processor, the non-transitory memory storing instructions which, when executed by the processor, perform a method according to claim 1 to generate a barcode with an embedded colour palette for colour correction.

\* \* \* \* \*